United States Patent [19]
Baldomero

[11] Patent Number: 6,036,212
[45] Date of Patent: Mar. 14, 2000

[54] DAMPING SYSTEM HAVING SEPARATELY ADJUSTABLE DAMPING CIRCUITS

[75] Inventor: Ricardo R. Baldomero, Felton, Calif.

[73] Assignee: Rockshox, Inc., San Jose, Calif.

[21] Appl. No.: 09/040,125

[22] Filed: Mar. 17, 1998

Related U.S. Application Data

[60] Provisional application No. 60/059,059, Sep. 16, 1997.

[51] Int. Cl.[7] .................................................. B62K 1/00
[52] U.S. Cl. ........................................... 280/276; 280/277
[58] Field of Search ..................... 280/276, 277; 188/282.1, 282.4, 282.6, 319.1, 319.2

[56] References Cited

U.S. PATENT DOCUMENTS

| | | | |
|---|---|---|---|
| 5,078,241 | 1/1992 | Ackerman et al. | 188/319.2 |
| 5,133,434 | 7/1992 | Kikushima et al. | 188/282.1 |
| 5,284,352 | 2/1994 | Chen | 280/276 |
| 5,445,401 | 8/1995 | Bradbury | 280/276 |
| 5,470,090 | 11/1995 | Stewart et al. | 280/276 |

Primary Examiner—Robert J. Oberleitner
Assistant Examiner—Robert J. McCarry, Jr.
Attorney, Agent, or Firm—Skadden Arps, Slate, Meagher & Flom; David W. Hansen

[57] ABSTRACT

An adjustable fluid damping system for use in a suspension system that undergoes compression and rebound. The fluid damping system permits independent adjustment of compression and rebound damping by providing separate compression and rebound damping circuits. Each circuit has a flow path with an inlet through which damping fluid flows during damping, and an adjuster that adjusts the degree to which the inlet is open and hence damping through that flow path. The compression and adjusters are selectively and independently coupled to the same adjuster rod via respective compression and rebound couplers. The adjuster rod can be coupled to only one of the couplers at a time. Rotation of the adjuster rod by means of an adjuster knob, which can be pulled outward or pushed inward to engage one of the compression and rebound couplers, causes rotation of the coupler coupled thereto and axial movement of the respective adjuster to modify damping through the associated damping circuit.

40 Claims, 4 Drawing Sheets

DAMPING SYSTEM HAVING SEPARATELY ADJUSTABLE DAMPING CIRCUITS

CROSS-REFERENCE TO RELATED PROVISIONAL APPLICATION

The present application claims the benefit of the earlier filing date of co-pending U.S. Provisional Patent Application Ser. No. 60/059,059, filed Sep. 16, 1997.

BACKGROUND OF THE INVENTION

The present invention relates to the design and construction of adjustable damping systems for suspension systems. More particularly, the present invention relates to a damping system having separately adjustable damping circuits, one for compression damping and one for rebound damping.

Suspension systems have been used for various applications, such as cushioning impacts, vibrations, or other disturbances experienced by vehicles and machinery. A common application of a suspension system is in bicycles and motorcycles for cushioning impacts or vibrations experienced by the rider when the vehicle is ridden over bumps, ruts, rocks, pot holes or other obstacles. When applied to bicycles, for example, such suspension systems have been positioned in or proximate to the front and rear forks, seat tube, head tube, and in other locations to insulate the rider from impacts.

Suspension systems typically include a spring system comprising one or more coil springs, elastomer springs, air springs, or other types of springs, either alone or in combination. It is often desirable to control the effect of such spring systems using a damping system. With respect to bicycles, as well as other vehicles, the degree of desired damping depends on a variety of variables, such as the speed of the bicycle, the terrain over which the bicycle is being ridden, the structure of the bicycle, the wheel width, and the weight and particular preferences of the rider. It therefore has been desirable to provide adjustable damping to achieve the widest possible range of damping performance for all classes of bicycles, riders, and terrains. Thus, damping systems have been provided with means for adjusting the damping rates.

The amount of damping required during the compression stroke of a suspension system is often different than the amount of damping required during the rebound or expansion stroke of the system. In addition, the compression and rebound damping requirements may change to differing degrees based upon the variables previously described. It is therefore desirable for the compression and rebound damping rates to be adjustable independently of one another.

Conventional suspension systems typically do not permit damping adjustment at all, or do not permit independent adjustment of the compression and rebound rates. This is particularly true for bicycle suspension systems, with respect to which it is of great importance that the suspensions system weigh as little and be as compact as possible. Accordingly, there is a need for a suspension system, and particularly for a bicycle suspension system, having a damping system that provides separately and independently adjustable compression and rebound damping rates.

The problem of how to provide separately adjustable compression and rebound damping is further exacerbated in suspension systems that use a single piston as the mechanism with which to generate most or all of the necessary damping forces. Thus, there is a particular need for a suspension system having a single piston damping system design that provides separately and independently adjustable compression and rebound damping rates, and particularly for a bicycle suspension system having such a damping system.

In addition, conventional suspension systems typically provide a preload adjustment knob for adjusting the preload of a spring system positioned at one end of the suspension system, and a damping adjustment knob for adjusting the system's damping characteristics positioned at the other end of the suspension system. Thus, it is desirable that a damping adjustment system permitting compression damping adjustment independent of rebound damping adjustment utilize a single adjustment actuator for achieving the compression and rebound adjustment.

Accordingly, one object of the present invention is to provide a suspension system, and particularly a bicycle suspension system, having a damping system that provides separately and independently adjustable compression and rebound damping.

Another object is to provide a suspension system having a single piston damping system design that provides separately and independently adjustable compression and rebound damping rates, and particularly a bicycle suspension system having such a damping system.

Yet another object is to provide a suspension system, and particularly a bicycle suspension system, having a damping system that provides separately and independently adjustable compression and rebound damping and that utilizes a single adjustment actuator for achieving the compression and rebound adjustment.

SUMMARY OF THE INVENTION

The present invention is directed to an adjustable damping system comprising an adjustable compression damping circuit and an adjustable rebound damping circuits, the two circuits being adjustable independently of one another by means of a single adjuster knob that is preferably accessible externally of the damping system.

The adjustable damping system comprises means for providing independently adjustable compression and rebound damping, the independently adjustable compression and rebound damping means including a compression damping circuit with a compression flow path defined therethrough, a rebound damping circuit having a rebound flow path defined therethrough, and a damping adjusting mechanism having a compression adjuster and a rebound adjuster. The damping system may also comprise a damping selection assembly coupled to the damping adjusting mechanism. The damping selection assembly is capable of moving the compression adjuster and the rebound adjuster independently of one another so that fluid flow though the compression flow path and fluid flow through the rebound flow path are separately adjustable.

Preferably, the damping system is positioned within a piston rod. In such a configuration, the compression flow path may comprise a compression inlet defined in the piston rod, a compression flow passage defined in the compression adjuster, and a compression outlet defined in the piston rod. Similarly, the rebound flow path may comprise a rebound inlet defined in the piston rod, a rebound flow passage defined in the rebound adjuster, and a rebound outlet defined in the piston rod.

The compression adjuster comprises a blocking element, and the damping selection assembly is coupled to the compression adjuster to move the blocking element to further restrict or lessen the restriction of the compression inlet, thus modifying the fluid flow of the compression flow path and the characteristics of the compression damping provided by the damping system. Similarly, the rebound adjuster comprises a blocking element, and the damping selection assembly is coupled to the rebound adjuster to move the blocking element to further restrict or lessen the restriction of the rebound inlet, thus modifying the fluid flow of the rebound flow path and the characteristics of the rebound damping provided by the damping system.

Specifically, in order to couple to the compression and rebound adjusters, the damping selection assembly comprises a compression coupler and a rebound coupler, and an adjuster rod capable of selectively engaging the compression coupler and the rebound coupler. The adjuster rod includes a first end having a compression coupler engagement portion and a rebound coupler engagement portion. Likewise, the compression coupler includes an adjuster rod engagement portion corresponding to and shaped to engage the compression coupler engagement portion of the adjuster rod, and the rebound coupler includes an adjuster rod engagement end corresponding to and shaped to engage the rebound coupler engagement portion of the adjuster rod. The compression coupler engagement portion and the rebound coupler engagement portion of the adjuster rod are positioned along the adjuster rod such that when the compression coupler engagement portion engages with the adjuster rod engagement end of the compression coupler, the rebound coupler engagement portion is disengaged from the adjuster rod engagement end of the rebound coupler, and when the rebound coupler engagement portion of the adjuster rod engages with the adjuster rod engagement end of the rebound coupler, the compression coupler engagement portion is disengaged from the adjuster rod engagement end of the compression coupler.

The compression coupler engagement portion of the adjuster rod and the adjuster rod engagement end of the compression coupler are shaped such that rotation of the adjuster rod causes rotation of the compression coupler, and the rebound coupler engagement portion of the adjuster rod and the adjuster rod engagement end of the rebound coupler are shaped such that rotation of the adjuster rod causes rotation of the rebound coupler. Because the compression coupler is coupled to the compression adjuster and rebound coupler is coupled to the rebound adjuster, selective engagement of the compression coupler by the adjuster rod will move the respective blocking element of the compression or rebound adjuster and will modify the compression or rebound damping.

The adjuster knob used in the present invention preferably is coupled to the adjuster rod for actuating the damping selection assembly. When the damping system is used in a closed suspension system such as a bicycle suspension fork, the adjuster knob is preferably externally accessible to the suspension system user. A user of the damping system is able to select whether to adjust the compression or rebound damping of the system by pulling the adjuster knob outward or pushing the knob inward. Once the adjuster knob is pushed inward or pulled outward, the damping circuit selected is adjusted by turning the knob. The adjuster knob may have a detent mechanism for providing a tactile and/or aural indication of the degree to which the adjuster knob has been rotated. The detent mechanism preferably comprises an index ball which rides against a detent surface for this purpose.

A compression valve mechanism may be positioned in the compression flow path, the compression valve mechanism permitting flow through the compression flow path in only one direction such that damping fluid is prevented from flowing through the compression flow path during rebound of the suspension system, and a rebound valve mechanism may be positioned in the rebound flow path, the rebound valve mechanism permitting flow through the rebound flow path in only one direction such that damping fluid is prevented from flowing through the rebound flow path during compression of the suspension system. Additional ports and/or valves including shims or other flow control mechanisms may be provided in the piston or elsewhere for regulating and damping compression and/or rebound fluid flows in the damping system.

A damping cartridge may also be used, such that the damping cartridge contains a fluid and has a piston slidably disposed therein, the piston being connected to the piston rod, whereby relative movement in one direction between the piston and the damping cartridge causes fluid to flow through the compression flow path, and relative movement in the other direction between the piston and the damping cartridge causes fluid to flow through the rebound compression flow path.

The piston rod in which the damping system is (at least partially) contained may be constructed of a thin-walled steel or other metal tube, and an insert may be positioned within the end of the piston rod so that the piston rod may be crimped to the insert. The insert preferably is hollow, such that the adjuster rod is axially slidable therethrough, and the compression and rebound couplers are each axially fixed with respect to the insert and each other.

In a preferred embodiment of the present invention, the damping system is used in a bicycle suspension fork comprising one or more telescoping struts having an inner fork tube and an outer fork tube, the inner fork tube being telescopingly and coaxially engaged with the outer fork tube of the telescoping strut, the bicycle suspension fork being compressible by relative movement of the inner and outer fork tubes toward each other, and being expandable by relative movement of the inner and outer fork tubes away from each other. The bicycle suspension fork also may comprise a spring element positioned between the first and second telescoping members of at least one telescoping strut for biasing the inner fork tube and the outer fork tube apart. In addition, the bicycle suspension fork preferably comprises a damping cartridge as previously described, a rod end plate is preferably attached to the end of the piston rod, and the piston rod preferably extends through the damper cartridge so that the rod end plate bears against the spring element.

Still other objects and advantages of the present invention will become readily apparent to those skilled in this art from the following detailed description, wherein only the preferred embodiment of the invention is described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE INVENTION

Figure 1:
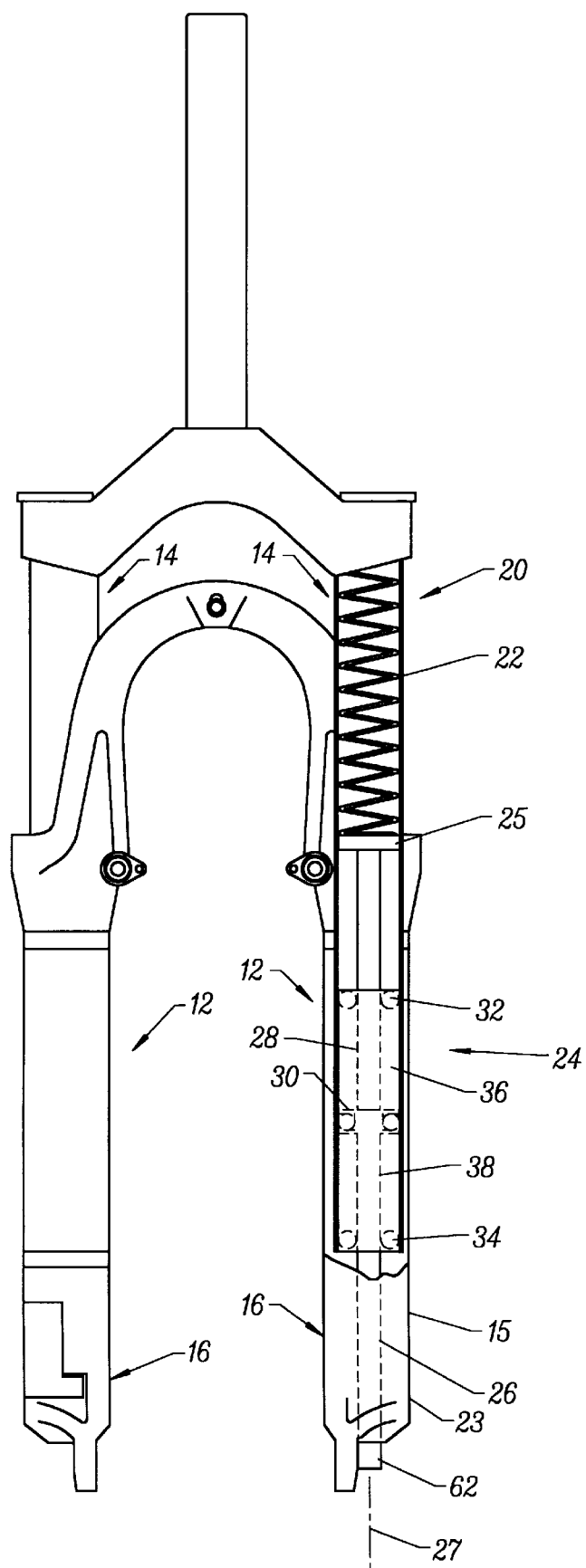
FIG. 1 is a perspective view, partially in section, of a bicycle fork in which a damping system formed in accordance with the principles of the present invention may be provided.

Referring to FIG. 1, a conventional bicycle suspension fork 10, in which the embodiments of the damping system of the present invention may be used, is shown. It will be appreciated that the use of bicycle suspension fork 10 is exemplary only, as the damping system of the present invention may be used in any suspension system for vehicles, machinery or any device in connection with which suspension may be used. Similarly, it will be appreciated that the damping system of the present invention may be disposed in any suspension system in the manner described herein for disposing the damping system within bicycle suspension fork 10.

Bicycle suspension fork 10 has a pair of telescoping struts 12, struts 12 being representative of the type of struts that may be found in a variety of fluid-based suspension systems. Each strut 12 includes an inner fork tube 14 slidably engaged within an outer fork tube 16. A suspension system 20 comprising spring elements 22 may be provided within fork struts 12 to bias fork tubes 14, 16 apart as well as to return fork tubes 14, 16 to a neutral, spaced-apart relationship following compression of fork 10, i.e., during the expansion or rebound stroke of fork 10 and suspension system 20. Typically, suspension system 20 is placed in at least one of struts 12 of bicycle fork 10. Of course, suspension system 20 may additionally, or alternatively, be placed at any other location on the bicycle frame, such as in the seat tube or head tube of the bicycle (not shown).

Preferably, a damping system 24 comprising means for providing independently adjustable compression and rebound damping is also provided to damp suspension system 20 as desired or necessary. Damping system 24 preferably includes hollow tubular piston rod 26 which has a longitudinal axis 27, is attached to a lower portion 23 of outer tube 16 and extends into inner fork tube 14. As shown in FIG. 1, piston rod 26 of damping system 24 of the present invention is positioned substantially coaxially within fork tubes 14, 16.

Damping system 24 preferably is used in a cartridge-type system. As FIG. 1 illustrates, in the preferred embodiment of bicycle suspension fork 10, damping system 24 comprises a damping cartridge 28 placed in the upper tube 14 of one of struts 12. Piston rod 26 extends substantially coaxially into, and preferably through, damping cartridge 28, which is sealed by O-ring seals or other seals at the locations where piston rod 26 enters or exits cartridge 28. If, as in FIG. 1, piston rod 26 extends entirely through cartridge 28, a rod end plate 25 may be attached to piston rod 26 to bear against spring element 22 for biasing inner fork tubes 14 and outer fork tubes 16 apart. A piston 30 is attached to piston rod 26 and is in sealing, sliding engagement with the inner surface of damping cartridge 28. As will be appreciated by those having skill in the art, piston 30 may have one or more ports or valves (as shown generally, for example, in FIGS. 3 and 4) extending through or around piston 30 so that fluid may flow past piston 30 when inner tube 14 moves with respect to outer tube 16. Piston 30, in conjunction with upper and lower sealing elements 32, 34, separates damping cartridge 28 (or inner tube 14, if damping system 24 is positioned directly in inner tube 14 without the use of damping cartridge 28) into first and second chambers 36, 38. Chambers 36, 38 are filled with a damping fluid, such as hydraulic fluid.

When fork tubes 14, 16 move relative to each other (closer together with inner tube 14 being further inserted into outer tube 16, as in the case of compression, or further apart with inner tube 14 sliding out of outer tube 16, as in the case of extension or rebound), the flow of fluid through the ports as piston 30 slides within the tubular element in which it is positioned (either inner tube 14 or cartridge 28) creates damping.

Figure 2:
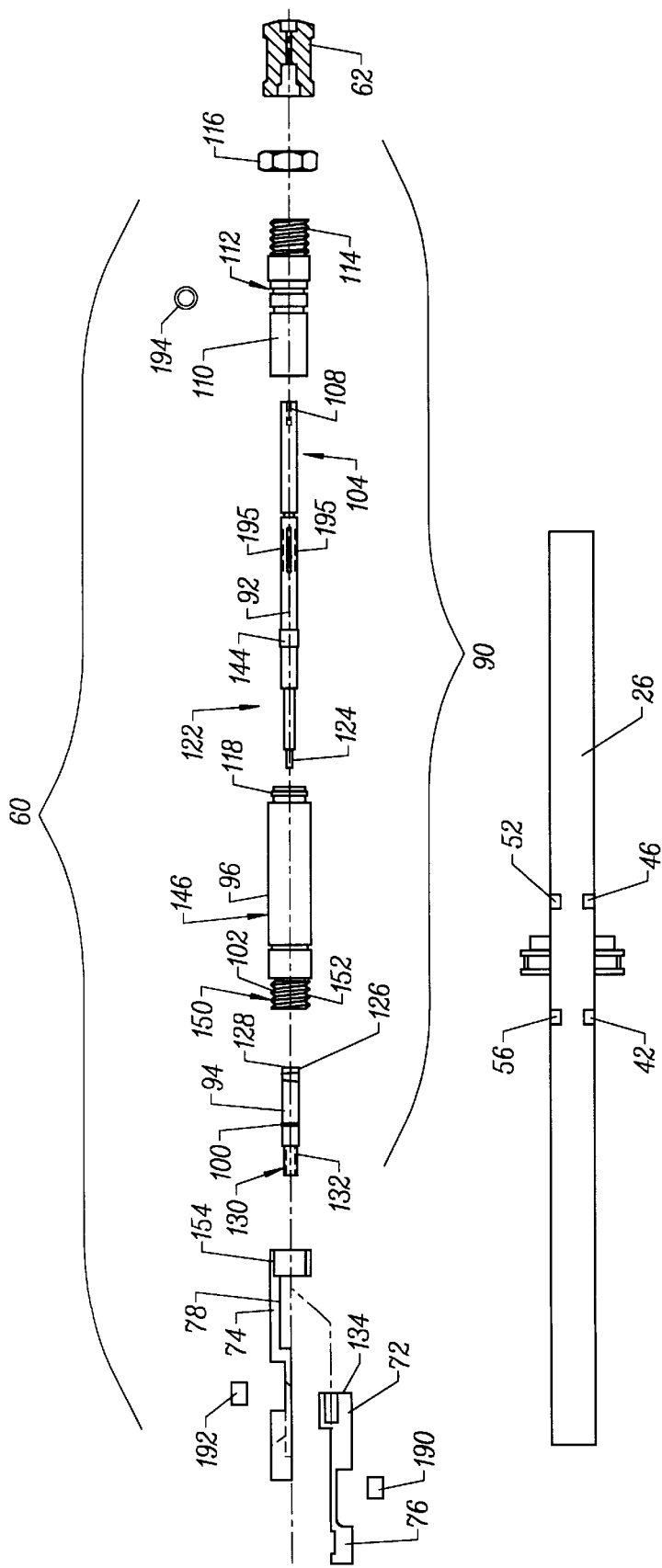
FIG. 2 is an exploded view of the adjustment mechanisms of the damping system of FIG. 1.
Figure 3:
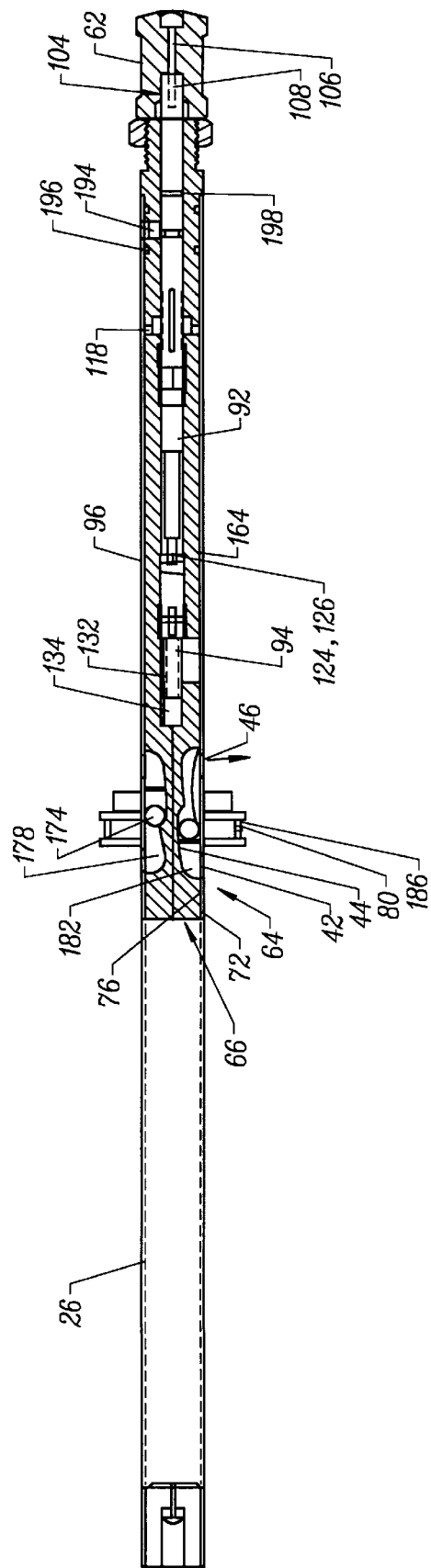
FIG. 3 is a partial cross-sectional view of the damping system of FIG. 1, illustrating the operation of the compression damping circuit of the present invention.
Figure 4:
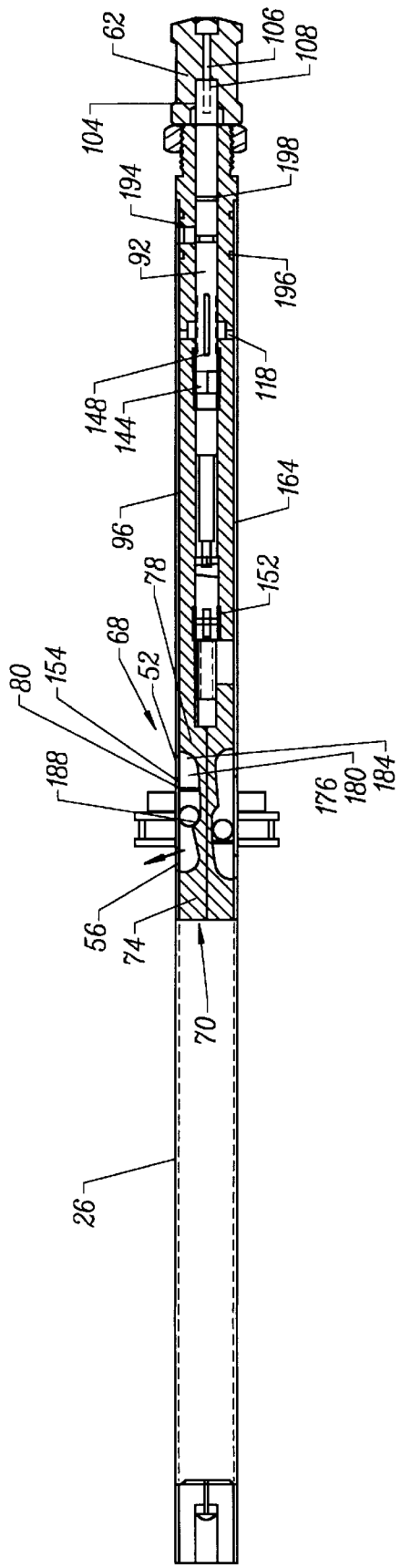
FIG. 4 is a partial cross-sectional view of the damping system of FIG. 1, illustrating the operation of the rebound damping circuit.

FIGS. 2 through 4 illustrate the inner workings of piston rod 26. Specifically, during compression, damping fluid passes into a compression inlet port 42 in piston rod 26 (FIGS. 2 and 3), through a compression flow passage 44 (FIG. 3), and then out a compression outlet port 46 (FIGS. 2 and 3) in piston rod 26, in the direction of the flow path arrow 48 shown in FIG. 3. Likewise, during rebound, damping fluid passes into a rebound inlet port 52 (FIGS. 2 and 4) in piston rod 26, through a rebound flow passage 54 (FIG. 4), and then out a rebound outlet port 56 (FIGS. 2 and 4) in the piston rod 26, in the direction of the flow path arrow 58 shown in FIG. 4.

A damping adjusting mechanism 60, shown in an exploded view in FIG. 2, and which will be described in greater detail below, is provided within hollow tubular piston rod 26 to control the fluid flow therethrough during compression and rebound. Damping adjusting mechanism 60 permits independent adjustment of the compression damping and the rebound damping. The actuation of damping adjusting mechanism 60 is accomplished through the use of an adjuster knob 62 that preferably extends out one of the ends of the telescoping tubes 14, 16 of fork 10 in which damping system 24 is provided so that a user may access damping adjusting mechanism 60. For example, as shown in FIG. 1, adjuster knob 62 is accessible externally of suspension system 20 through the bottom end 15 of outer tube 16 of suspension fork 10.

FIGS. 2 through 4 illustrate a preferred embodiment of damping adjusting mechanism 60 formed in accordance with the principles of the present invention, isolated from suspension fork 10 and the remainder of damping system 24 of FIG. 1. Damping system 24 of the present invention provides a compression flow path 64 (including inlet 42, compression passage 44, and outlet 46) through an adjustable compression damping circuit 66 that is separate and isolated from a rebound flow path 68 (including inlet 52, rebound passage 54, and outlet 56) in an adjustable rebound damping circuit 70. Thus, compression damping and rebound damping may be separately adjusted and controlled.

In accordance with the principles of the present invention, compression damping circuit 66 includes a compression damping flow adjuster 72 for varying compression damping characteristics, and rebound damping circuit 70 includes a rebound damping flow adjuster 74 for varying rebound damping characteristics. The flow of fluid along each of the compression and rebound flow paths 64, 68 is controlled by the position of respective flow adjusters 72, 74 with respect to inlet ports 42, 52 in piston rod 26 for operation in connection with the respective fluid flows. At least a portion of the flow passages 44, 54 are formed within respective flow adjusters 72, 74 such that damping fluid flows through adjusters 72, 74 in piston rod 26 to flow between chamber 36 and 38. Each flow adjuster 72, 74 includes a blocking element 76, 78 such that movement of adjusters 72, 74 within piston rod 26 causes the respective blocking element 76, 78 to block or unblock selectively and progressively the respective inlet ports 42, 52 to respective flow paths 64, 68. Modification of the damping characteristics of compression damping circuit 66 and rebound damping circuit 70 is achieved by adjusting the degree to which blocking elements 76, 78 block corresponding compression or rebound inlet port 42, 52 in piston rod 26. Compression and rebound adjusters 72, 74 are separately slidable so that independent adjustment of the damping characteristics of damping system 24 of the present invention is possible.

In the embodiment of FIG. 3, when compression blocking element 76 of compression adjuster 72 is moved in a direction toward adjuster knob 62 (i.e., to the right in FIG. 3), compression inlet port 42 becomes progressively blocked. The flow of damping fluid through compression flow path 64 thus may be regulated by varying the extent to which compression flow path 64, particularly compression inlet port 42, is blocked by compression blocking element 76 of compression adjuster 72.

Likewise, as in the embodiment of FIG. 4, by sliding rebound blocking element 78 of rebound adjuster 74 in a direction away from adjuster knob 62 (i.e., to the left in FIG. 4) rebound inlet port 52 becomes progressively blocked. The flow of damping fluid thus may be regulated by varying the extent to which rebound fluid flow path 68, particularly rebound inlet port 52, is blocked by rebound blocking element 78.

Preferably, adjusters 72, 74 are prevented from rotating relative to piston rod 26 so that the portion of flow passages 44, 54 therethrough remain aligned with their associated inlet ports 42, 52 and outlet ports 46, 56. To prevent such rotation in the embodiment shown in FIGS. 3 and 4, a pin 80 is passed through piston rod 26 to engage at least one of adjusters 72, 74 such that adjusters 72, 74 may slide axially yet are prevented from rotating relative to piston rod 26.

As mentioned previously, the damping characteristics of the compression and rebound circuits 66, 70 are separately adjustable, as compression and rebound adjusters 72, 74 are independently movable with respect to piston rod 26 to regulate compression or rebound flow along respective compression and rebound flow paths 64, 68. To effect such independent movement, damping adjusting mechanism 60 comprises a damping selection assembly 90. Damping selection assembly 90 includes an adjuster rod 92, a compression coupler 94, and a rebound coupler 96, as illustrated in FIGS. 2 through 4. Movement of adjuster rod 92 along longitudinal axis 27 of piston rod 26 permits adjustment of the damping characteristics of damping system 24, as will be described in greater detail below.

In the preferred embodiment of FIGS. 2 through 4, adjuster rod 92 passes axially through rebound coupler 96. At least a portion of compression coupler 94 is also coaxially positioned within rebound coupler 96. Preferably, compression coupler 94 is coupled to rebound coupler 96 so as to permit independent rotation of couplers 94, 96 relative to each other, yet to inhibit relative axial movement of couplers 94, 96. For example, as can be seen in FIG. 2, a detent 100 is formed around compression coupler 94 for snap-fitting within a corresponding annular groove (not shown) formed in a first end 102 of rebound coupler 96.

Adjuster rod 92 is preferably connected at a second end 104 by any suitable means to adjuster knob 62 such that rotation and axial movement (along longitudinal axis 27) of adjuster knob 62 causes a corresponding movement of adjuster rod 92. In a preferred embodiment, adjuster rod 92 is fixedly connected to adjuster knob 62 such as by a crew 106 inserted through a counterbore 108 second end 104 of adjuster rod 92, as shown in FIGS. 3 and 4.

Adjuster rod 92 has a first end 122 that is selectively engageable with either the compression coupler 94 or the rebound coupler 96. Each coupler 94, 96 is, in turn, coupled to its respective corresponding adjuster 72, 74. Thus, depending upon its axial position, rotation of adjuster rod 92 causes rotation of either compression coupler 94 or rebound coupler 96 engaged therewith, and the resulting axial movement of the corresponding adjuster 72, 74 to result in modification of the corresponding flow path 64, 68, as follows.

First end 122 of adjuster rod 92 is provided with a compression coupler engagement portion 124 engageable with compression coupler 94. Compression coupler 94 thus has a corresponding adjuster rod engagement portion 126 shaped for engagement with compression coupler engagement portion 124 of adjuster rod 92. In a preferred embodiment, adjuster rod engagement portion 126 of compression coupler 94 has a splined counterbore 128 and compression coupler engagement portion 124 of adjuster rod 92 is also splined, so that compression coupler 94 may be engaged by and rotate as a unit with adjuster rod 92.

Engagement of adjuster rod 92 with compression coupler 94 thus is accomplished by pushing adjuster knob 62 in (to the left in FIG. 3), towards compression coupler 94, thereby inserting compression coupler engagement portion 124 of adjuster rod 92 into counterbore 128 of compression coupler 94. Once adjuster rod 92 and compression coupler 94 are engaged, rotation of adjuster rod 92 (effected by rotation of adjuster knob 62 connected thereto) causes corresponding rotation of compression coupler 94. Rotation of compression coupler 94 causes axial movement of compression adjuster 72 and adjustment of the compression damping characteristics of damping system 24 as follows.

The first end 130 of compression coupler 94 has a compression adjuster engagement portion 132 (opposite adjuster rod engagement portion 126) shaped for engaging compression adjuster 72. In a preferred embodiment, compression adjuster engagement portion 132 is externally threaded for engagement with an internally threaded connection end 134 of compression adjuster 72. Thus, compression coupler 94 and compression adjuster 82 are threadably coupled together. Because compression adjuster 72 is fixed against rotation with respect to piston rod 26 but is axially moveable (whereas axial movement of compression coupler 94 preferably is inhibited as described above), rotation of compression coupler 94 results in axial movement of compression adjuster 72 within piston rod 26. For example, in the preferred embodiment, clockwise rotation of adjuster knob 62 and adjuster rod 92 and hence compression coupler 94 causes compression adjuster 72 to move towards adjuster knob 62 (to the right in FIG. 3), thereby progressively blocking compression inlet port 42 with blocking element 76 of compression adjuster 72. Counterclockwise rotation of adjuster knob 62 and adjuster rod 92 and hence compression coupler 94 causes compression adjuster 72 to move away from adjuster knob 62 (to the left in FIG. 3), progressively opening compression inlet port 42.

Closure of compression inlet port 42 reduces compression fluid flow past piston 30, generally resulting in an increase in compression damping. Maximum damping may be substantially provided upon complete closure of compression inlet port 42 by blocking element 76 of compression adjuster 72. Opening of compression inlet port 42 generally increases flow through compression flow path 64, generally decreasing compression damping.

In order to modify rebound damping characteristics of suspension system 20 and damping systems 24, adjuster rod 92 must be disengaged from compression coupler 94 (by pulling adjuster knob 62 out (to the right in FIG. 4) and engaged with rebound coupler 96. The first end 122 of adjuster rod 92 thus is provided with a rebound coupler engagement portion 144 engageable with an adjuster rod engagement end 146 of rebound coupler 96. Preferably, adjuster rod engagement end 146 is provided with an adjuster rod engagement element 148 formed within rebound coupler 96. Rebound coupler engagement portion 144 and adjuster rod engagement element 148 may be provided with splines, flats or other engagement surfaces such that when adjuster rod engagement end 146 is engaged with adjuster rod engagement element 148 of rebound coupler 96, adjuster rod 92 and rebound coupler 96 are fixed for rotation together as a unit. In a preferred embodiment, rebound coupler engagement portion 144 of adjuster rod 92 is in the form of a shoulder or other projecting surface shaped to engage a correspondingly shaped recess comprising adjuster rod engagement element 148 of rebound coupler pier 96 such that adjuster rod 92 and rebound coupler 96 rotate as a unit when coupled together.

Engagement of adjuster rod 92 with rebound coupler 96 is thus accomplished by pulling adjuster knob 62 sufficiently outward (to the right in FIG. 3) to engage rebound coupler engagement portion 144 on adjuster rod 92 with adjuster rod engagement element 148 of rebound coupler 96. Once adjuster rod 92 and rebound coupler 96 are engaged, rotation of adjuster rod 92 (typically effected by rotation of adjuster knob 62 connected thereto) causes corresponding rotation of rebound coupler 96. Rotation of rebound coupler 96 causes axial movement of rebound adjuster 74 and control of rebound damping characteristics as follows.

The first end 150 of rebound coupler 96 has an rebound adjuster engagement portion 152 shaped for engaging rebound adjuster 74. In a preferred embodiment, rebound adjuster engagement portion 152 is externally threaded for engagement with an internally threaded connection end 154 of rebound adjuster 74. Thus, rebound coupler 96 and rebound adjuster 74 are threadably coupled together. Because rebound adjuster 74 is fixed against rotation with respect to the piston rod 26 but is axially moveable (whereas axial movement of rebound coupler 96 preferably is inhibited), rotation of rebound coupler 96 results in axial movement of rebound adjuster 74 within piston rod 26. For example, counterclockwise rotation of adjuster knob 62 and adjuster rod 92 and hence rebound coupler 96 may cause rebound adjuster 74 to move away from adjuster knob 62 (to the left in FIG. 4), thereby progressively blocking rebound inlet port 52 with blocking element 78 of rebound adjuster 74. Likewise, clockwise rotation of adjuster knob 62 and adjuster rod 92 and hence rebound coupler 96 may cause rebound adjuster 74 to move toward adjuster knob 62 (to the right in FIG. 4), progressively opening rebound inlet port 52.

As with compression damping adjustment, closure of rebound inlet port 52 reduces rebound damping flow, generally resulting in an increase in rebound damping. Maximum rebound damping is substantially provided upon complete closure of rebound inlet port 52 by blocking element 78 of rebound adjuster 74. Likewise, opening of rebound inlet port generally increases flow through rebound flow path, generally decreasing rebound damping.

Preferably, compression and rebound adjusters 72, 74 cannot be moved further once the corresponding inlet port 42, 52 is completely blocked by the adjuster 72, 74. Likewise, upon completely clearing an inlet port 42, 52, the respective adjuster 72, 74 is preferably prevented from further movement such that the adjuster 72, 74 does not become disengaged from its respective coupler 94, 96. Such prevention of excess axial movement may be accomplished by pin 80, which also prevents rotation of adjusters 72, 74 relative to piston rod 26.

Thus, adjuster rod 92 and compression and rebound couplers 72, 74 permit independent movement of compression and rebound adjusters 72, 74 to effectuate independent modification of compression and rebound damping characteristics.

Adjuster rod 92 is slidably positioned within a threaded insert 110 which functions as a bushing for adjuster rod 92 within piston rod 26. Piston rod 26, which is preferably formed of thin-wall metal, is fixedly secured to outer surface 112 of threaded insert 110 by a crimping process such as roll-crimping. In any event, the crimping should be such as to result in piston rod 26 and threaded insert 110 being rotationally and axially fixed to one another. The use of threaded insert 110 thus permits use of a light-weight piston rod 26.

When used in an application such as in bicycle suspension fork 10 of FIG. 1, a threaded end 114 of insert 110 may be extended through bottom end 15 of outer tube 16 of suspension fork 10, such that adjuster knob 62 is accessible for external adjustment and damping adjusting mechanism 60 is fixed, such as by using a connection nut 116 provided on threaded end 114 of insert 110, with respect to the respective telescoping strut. Additionally, a connection nut 116 is provided on threaded end 114 of insert 110.

Preferably, rebound coupler 96 is coupled to threaded insert 110 in a manner that permits independent rotation of rebound coupler 96 relative to threaded insert 110, yet inhibits axial movement of rebound coupler 96 within insert 110 and hence piston rod 26. As illustrated in FIGS. 2 through 4, a detent 118 may be formed around rebound coupler 96 for snap-fitting within a corresponding annular groove 120 formed in threaded insert 110, as may be understood with reference to FIG. 2. Compression coupler 94 is effectively coupled to insert 110 via its connection to rebound coupler 96, and thus is also axially fixed, yet still capable of being rotated.

In a preferred embodiment, a friction O-ring 164 is positioned circumferentially about rebound coupler 96, as shown in FIGS. 3 and 4. An isolator mechanism 164 preferably comprising a friction O-ring prevents rotation of rebound coupler 96 and hence axial movement of rebound adjuster 74 during rotation of compression coupler 94.

This mechanism, in combination with the disengagement of damping selection assembly 90 (particularly rebound coupler engagement portion 144) from rebound coupler 96 hence rebound adjuster 74, ensures that the rebound damping characteristics of suspension system 20 will not be modified during modification of the compression damping characteristics.

Because damping fluid should flow along the compression flow path 64 only during the compression stroke and not during the rebound stroke, and along the rebound flow path 68 only during the rebound stroke and not during the compression stroke, a one-way compression flow valve 170 is formed to restrict flow through compression passage 44, and a one-way rebound flow valve 172 is formed to restrict flow through compression passage 54. In a preferred embodiment, the one-way valve mechanisms 170, 172 in respective compression and rebound flow passages 44, 54 include compression and rebound check balls 174, 176 movably positioned in valve chambers 178, 180 formed in flow passages 44, 54, as may be seen in FIGS. 2 and 4. Valve seats 182, 184 are formed at an end of each valve chamber 44, 54 adjacent the inlet ports 42, 52 of respective flow passages 44, 54. When the compression or rebound check ball 174, 176 is moved into position against its respective valve seat 182, 184 by flow in the wrong direction (e.g., compression check ball 174 is moved by rebound flow against compression valve seat 182 during rebound stroke and the rebound check ball 176 is moved by compression flow against rebound valve seat 184 during the compression stroke), flow through flow passages 44, 54 is substantially restricted, and preferably completely stopped. In a preferred embodiment, as shown in FIGS. 3 and 4, valve seats 182, 184 are positioned such that when check ball 174, 176 is seated against its respective valve seat 182, 184, check ball 174, 176 also closes the corresponding inlet port 42, 52, thereby restricting flow in the wrong direction for the given flow path 64, 68 by substantially preventing the respective inlet port 42, 52 from functioning as an outlet port. Each flow passage 44, 54 also has a shoulder 186, 188 against which check ball 174, 176 is forced during flow in the proper direction for the given flow path 64, 68. The flow passage 44, 54, shoulder 186, 188, and check ball 174, 176 are dimensioned such that flow may continue around check ball 174, 176 when check ball 174, 176 is engaged against shoulder 186, 188. In an alternative embodiment, shown in FIG. 2, the valve mechanism 170, 172 may include a plug 190, 192 instead of a check ball 174, 176.

In order to provide the user with a tactile and/or aural indication of the degree to which the compression or rebound adjusters 72, 74 have been adjusted by damping adjusting mechanism 60 of the present invention, an index ball 194 or other detent mechanism may be used. Detent surfaces 195, which may comprise a plurality of ridges or splines, are provided adjacent to index ball 194 on adjuster rod 92 of damping adjusting mechanism 60. Rotation of adjuster rod 92 causes movement of index ball 194 with respect to detent surfaces 195 provides a tactile and/or aural indication of the amount of rotation of adjuster knob 62. In a preferred embodiment, index ball 194 is positioned into engagement with detent surfaces 195 through a hole bored perpendicular to axis 27 of piston rod 26 in the external surface of threaded insert 110, and is maintained in such position by the internal surface of piston rod 26.

Damping adjusting mechanism 60 preferably is sealed at two locations with any desired sealant available, such as an O-ring 196, 198, as shown in FIGS. 3 and 4. The first seal 196 is preferably located at the interface of the outer surface of threaded insert 110 and inner surface of piston rod 26. The second seal 198 is preferably located at the interface of the inner surface of threaded insert 110 and the outer surface of the adjuster rod 26. These seals 196, 198 are provided to prevent damping system fluid from leaking out of piston rod 26, thereby restraining fluid flow to along the designated damping flow path 64, 68.

It will be appreciated that the interengaging elements described may be formed in reverse engagement arrangements to those described. For instance, an element described as having a recess or groove may instead be formed with a boss or shoulder, while the corresponding element described as having a boss or shoulder thus is formed with a recess or groove. Similarly, the position of one element axially within another element, or the receipt of an element by another element may be reversed without departing from the principles of the present invention.

It will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims, and not limited to the foregoing description.

What is claimed is:

1. An adjustable damping system comprising:
   an adjustable compression damping circuit;
   an adjustable rebound damping circuit; and
   a single adjuster knob for both damping circuits;
   wherein said adjustable compression damping circuit and said adjustable rebound damping circuit may be adjusted independently of one another using said adjuster knob.

2. An adjustable damping system for damping a flow of damping fluid in a suspension system undergoing compression and rebound, said adjustable damping system comprising:
   a compression damping circuit having a compression flow path defined therethrough;
   a rebound damping circuit having a rebound flow path defined therethrough;
   a damping adjusting mechanism having a compression adjuster and a rebound adjuster; and
   a damping selection assembly coupled to said damping adjusting mechanism, said damping selection assembly being capable of moving said compression adjuster and said rebound adjuster independently of one another so that fluid flow though said compression flow path and fluid flow through said rebound flow path are separately adjustable through said adjuster knob.

3. An adjustable damping system as in claim 2, further comprising a piston rod, and wherein:
   said damping system is positioned within said piston rod;
   said compression flow path comprises a compression inlet defined in said piston rod, a compression flow passage defined in said compression adjuster, and a compression outlet defined in said piston rod; and
   said rebound flow path comprises a rebound inlet defined in said piston rod, a rebound flow passage defined in said rebound adjuster, and a rebound outlet defined in said piston rod.

4. An adjustable damping system as in claim 3, wherein:
   said compression adjuster further comprises a blocking element, said damping selection assembly being coupled to said compression adjuster to move said blocking element with respect to said compression inlet to modify flow through said compression flow path and thereby modify compression damping; and
   said rebound adjuster further comprises a blocking element, said damping selection assembly being coupled to said rebound adjuster to move said blocking element with respect to said rebound inlet to modify flow through said rebound flow path and thereby modify rebound damping.

5. An adjustable damping system as in claim 4, wherein:
said damping selection assembly comprises a compression coupler and a rebound coupler, and said damping selection assembly further comprises an adjuster rod for selective engagement with said compression coupler and said rebound coupler;
said compression coupler is coupled to said compression adjuster; and
said rebound coupler is coupled to said rebound adjuster.

6. An adjustable damping system as in claim 5, further comprising said adjuster knob coupled to said adjuster rod, said adjuster knob providing user access to said damping selection assembly.

7. An adjustable damping system as in claim 5, wherein said flow path through said compression damping circuit may be adjusted independently of said flow path through said rebound damping circuit by pushing in and turning, or by pulling out and turning, said adjuster knob.

8. An adjustable damping system as in claim 6, said damping system further comprising:
a damping cartridge containing a fluid and a piston slidably disposed therein; and
said piston being connected to said piston rod, whereby relative movement between said piston and said damping cartridge causes fluid to flow through said compression flow path or said rebound compression flow path.

9. An adjustable damping system as in claim 6, further comprising a detent mechanism for indicating the degree to which said adjuster knob has been rotated.

10. An adjustable damping system as in claim 9, wherein said detent mechanism comprises an index ball and a detent surface, said index ball riding against said detent surface to provide at least a tactile indication of the degree to which said adjuster knob has been rotated.

11. An adjustable damping system as in claim 5, wherein:
said adjuster rod includes a first end having a compression coupler engagement portion and a rebound coupler engagement portion;
said compression coupler includes an adjuster rod engagement portion corresponding to and shaped to engage said compression coupler engagement portion of said adjuster rod;
said rebound coupler includes an adjuster rod engagement end corresponding to and shaped to engage said rebound coupler engagement portion of said adjuster rod; and
said compression coupler engagement portion and said rebound coupler engagement portion of said adjuster rod are positioned along said adjuster rod such that when said compression coupler engagement portion engages with said adjuster rod engagement end of said compression coupler, said rebound coupler engagement portion is disengaged from said adjuster rod engagement end of said rebound coupler, and when said rebound coupler engagement portion of said adjuster rod engages with said adjuster rod engagement end of said rebound coupler, said compression coupler engagement portion is disengaged from said adjuster rod engagement end of said compression coupler.

12. An adjustable damping system as in claim 11, wherein:
said compression coupler engagement portion of said adjuster rod and said adjuster rod engagement end of said compression coupler are shaped such that rotation of said adjuster rod causes rotation of said compression coupler; and said rebound coupler engagement portion of said adjuster rod and said adjuster rod engagement end of said rebound coupler are shaped such that rotation of said adjuster rod causes rotation of said rebound coupler.

13. An adjustable damping system as in claim 12, wherein:
said compression adjuster and said rebound adjuster are fixed against rotating with respect to said piston rod;
axial movement of said adjuster rod with respect to said piston rod causes selective engagement of only one of said compression coupler engagement portion and said rebound coupler engagement portion with a corresponding adjuster rod engagement end;
rotational movement of said adjuster rod with respect to said piston rod causes rotation of said coupler with which said adjuster rod is engaged;
rotational movement of said couplers with said adjuster rod with respect to said piston rod causes axial movement of said adjuster with which said coupler is coupled; and
rotational movement of said compression or rebound coupler causes axial movement of said compression or rebound adjuster with respect to said inlet ports;
whereby engagement of said compression coupler engagement portion of said adjuster rod with said adjuster rod engagement end of said compression coupler and consequent rotation of said adjuster rod causes said blocking element of said compression adjuster to move with respect to said compression inlet to modify compression damping, and engagement of said rebound coupler engagement portion of said adjuster rod with said adjuster rod engagement end of said rebound coupler and consequent rotation of said adjuster rod causes said blocking element of said rebound adjuster to move with respect to said rebound inlet to modify rebound damping.

14. An adjustable damping system as in claim 13, further comprising:
a compression valve mechanism positioned in said compression flow path, said compression valve mechanism permitting flow through said compression flow path in only one direction such that damping fluid is prevented from flowing through said compression flow path during rebound of said suspension system; and
a rebound valve mechanism positioned in said rebound flow path, said rebound valve mechanism permitting flow through said rebound flow path in only one direction such that damping fluid is prevented from flowing through said rebound flow path during compression of said suspension system.

15. An adjustable damping system as in claim 6, further comprising an insert positioned within said piston rod and through which said adjuster rod is axially slidable.

16. An adjustable damping system as in claim 15, wherein said piston rod is crimped to said insert.

17. An adjustable damping system as in claim 15, wherein said compression coupler and said rebound coupler are each axially fixed with respect to said insert and each other.

18. An adjustable damping circuit as in claim 2, wherein said damping selection assembly further comprises a compression coupler coupled to said compression adjuster and a rebound coupler coupled to said rebound adjuster.

19. An adjustable damping circuit as in claim 18, wherein said damping selection assembly further comprises an adjuster rod selectively engageable with one of said compression coupler and said rebound coupler.

20. An adjustable damping system as in claim 19, wherein:
  said adjuster rod includes a first end having a compression coupler engagement portion and a rebound coupler engagement portion;
  said compression coupler includes an adjuster rod engagement end corresponding to and shaped to engage said compression coupler engagement portion;
  said rebound coupler includes an adjuster rod engagement end corresponding to and shaped to engage said rebound coupler engagement portion; and
  said compression coupler engagement portion and said rebound coupler engagement portion of said adjuster rod are positioned along said adjuster rod such that when said compression coupler engagement portion engages with said adjuster rod engagement end of said compression coupler, said rebound coupler engagement portion is disengaged from said adjuster rod engagement end of said rebound coupler, and when said rebound coupler engagement portion of said adjuster rod engages with said adjuster rod engagement end of said rebound coupler, said compression coupler engagement portion is disengaged from said adjuster rod engagement end of said compression coupler.

21. An adjustable damping system as in claim 2, further comprising:
  a compression valve mechanism positioned in said compression flow path, said compression valve mechanism permitting flow through said compression flow path in only one direction such that damping fluid is prevented from flowing through said compression flow path during rebound of said suspension system; and
  a rebound valve mechanism positioned in said rebound flow path, said rebound valve mechanism permitting flow through said rebound flow path in only one direction such that damping fluid is prevented from flowing through said rebound flow path during compression of said suspension system.

22. A bicycle suspension fork, comprising:
  a telescoping strut, said telescoping strut comprising an inner fork tube and an outer fork tube, said inner fork tube of said telescoping strut being telescopingly and coaxially engaged with said outer fork tube of said telescoping strut, said bicycle suspension fork being compressible by relative movement of said inner and outer fork tubes toward each other, and being expandable by relative movement of said inner and outer fork tubes away from each other;
  a spring element positioned between said first and second telescoping members of said telescoping strut for biasing said inner fork tube and said outer fork tube apart; and
  means for providing independently adjustable compression and rebound damping.

23. A bicycle suspension fork as in claim 22, wherein said means for providing independently adjustable compression and rebound damping comprises:
  a compression damping circuit having a compression flow path defined therethrough;
  a rebound damping circuit having a rebound flow path defined therethrough; and
  a damping adjusting mechanism having a compression adjuster and a rebound adjuster.

24. A bicycle suspension fork as in claim 23, wherein said damping system further comprises a damping selection assembly coupled to said damping adjusting mechanism, said damping selection assembly being capable of moving said compression adjuster and said rebound adjuster independently of one another so that fluid flow though said compression flow path and fluid flow through said rebound flow path are separately adjustable.

25. A bicycle suspension fork as in claim 24, further comprising a piston rod connected to said outer fork tube, and wherein:
  said compression adjuster and said rebound adjuster of said damping adjusting mechanism is positioned within said piston rod;
  said compression flow path comprises a compression inlet defined in said piston rod, a compression flow passage defined in said compression adjuster, and a compression outlet defined in said piston rod; and
  said rebound flow path comprises a rebound inlet defined in said piston rod, a rebound flow passage defined in said rebound adjuster, and a rebound outlet defined in said piston rod.

26. A bicycle suspension fork as in claim 25, wherein:
  said compression adjuster further comprises a blocking element, said damping selection assembly being coupled to said compression adjuster to move said blocking element with respect to said compression inlet to modify flow through said compression flow path and thereby modify compression damping; and
  said rebound adjuster further comprises a blocking element, said damping selection assembly being coupled to said rebound adjuster to move said blocking element with respect to said rebound inlet to modify flow through said rebound flow path and thereby modify rebound damping.

27. A bicycle suspension fork as in claim 26, wherein:
  said damping selection assembly comprises a compression coupler and a rebound coupler, and said damping selection assembly further comprises an adjuster rod for selective engagement with said compression coupler and said rebound coupler;
  said compression coupler is coupled to said compression adjuster; and
  said rebound coupler is coupled to said rebound adjuster.

28. A bicycle suspension fork as in claim 27, further comprising an adjuster knob coupled to said adjuster rod, said adjuster knob providing user access to said damping selection assembly.

29. An adjustable damping system as in claim 28, wherein said flow path through said compression damping circuit may be adjusted independently of said flow path through said rebound damping circuit by pushing in and turning, or by pulling out and turning, said adjuster knob.

30. A bicycle suspension fork as in claim 28, said damping system further comprising:
  a damping cartridge containing a fluid and a piston slidably disposed therein; and
  said piston being connected to said piston rod, whereby relative movement between said piston and said damping cartridge causes fluid to flow through said compression flow path or said rebound compression flow path.

31. A bicycle suspension fork as in claim 30, wherein a rod end plate is attached to said piston rod, said piston rod extending through said damper cartridge to bear against said spring element.

32. A method of independently damping compression and rebound of a fluid damping system in a suspension system, said method comprising the steps of:

providing a damping system having a compression flow path and a rebound flow path, said compression flow path and said rebound flow path being isolated from each other;

providing a damping adjusting mechanism having a compression adjuster separately movable from a rebound adjuster, said compression adjuster and said rebound adjuster being separately movable to modify damping fluid flow through said compression flow path and said rebound flow path, respectively;

providing a damping selection assembly coupled to said damping adjusting mechanism, said damping selection assembly having a user accessible adjuster rod;

coupling said adjuster rod with only said compression adjuster to modify compression damping without modifying rebound damping; and coupling said adjuster rod with only said rebound adjuster to modify rebound damping without modifying compression damping.

33. A method as in claim 32, further comprising the steps of:

axially moving said adjuster rod to be coupled with only said compression adjuster and rotating said adjuster rod to cause said compression adjuster to modify compression damping through said compression flow path; and axially moving said adjuster rod to be uncoupled from said compression adjuster and to be coupled with only said rebound adjuster and rotating said adjuster rod to cause said rebound adjuster to modify rebound damping through said rebound flow path.

34. A method as in claim 33, wherein:

said damping system is provided in a piston rod;

said compression flow path comprises a compression inlet port defined in said piston rod, a compression flow passage defined in said compression adjuster, and a compression outlet port defined in said piston rod;

said compression adjuster further comprises a blocking element selectively movable with respect to said compression inlet port;

rotation of said adjuster rod causes said compression adjuster blocking element to move axially with respect to said compression inlet port to thereby control compression damping flow therethrough;

said rebound flow path comprises a rebound inlet port defined in said piston rod, a rebound flow passage defined in said rebound adjuster, and a rebound outlet port defined in said piston rod;

said rebound adjuster further comprising a blocking element selectively movable with respect to said rebound inlet port; and rotation of said adjuster rod causes said rebound adjuster blocking element to move axially with respect to said rebound inlet port to thereby control rebound damping flow therethrough.

35. A method as in claim 34, further comprising the steps of:

providing a compression coupler coupled to said compression adjuster and selectively engaged by said adjuster rod to couple said adjuster rod to only said compression adjuster; and providing a rebound coupler coupled to said rebound adjuster and selectively engaged by said adjuster rod to couple said adjuster rod to only said rebound adjuster;

wherein:

said compression coupler rotates with said adjuster rod only when coupled thereto;

said compression coupler is rotatable with respect to said compression adjuster;

said compression adjuster is fixed against rotation, such that rotation of said compression coupler causes axial movement of said compression adjuster to modify compression damping;

said rebound coupler rotates with said adjuster rod only when coupled thereto;

said rebound coupler is rotatable with respect to said rebound adjuster; and said rebound adjuster is fixed against rotation, such that rotation of said rebound coupler causes axial movement of said rebound adjuster to modify rebound damping.

36. An adjustable damping system for damping a flow of damping fluid in a suspension system undergoing compression and rebound, said adjustable damping system comprising:

a piston rod;

a damping adjusting mechanism having a compression adjuster and a rebound adjuster;

a compression damping circuit having a compression flow path defined therethrough and comprising a compression inlet defined in said piston rod, a compression outlet defined in said piston rod, and a compression flow passage defined in said compression adjuster;

a rebound damping circuit having a rebound flow path defined therethrough and comprising a rebound inlet defined in said piston rod, a rebound outlet defined in said piston rod, and a rebound flow passage defined in said rebound adjuster;

a damping selection assembly coupled to said damping adjusting mechanism and comprising a compression coupler coupled to said compression adjuster, a rebound coupler coupled to said rebound adjuster, and an adjuster rod for selective engagement with said compression coupler and said rebound coupler, said damping selection assembly being capable of moving said compression adjuster and said rebound adjuster independently of one another so that fluid flow though said compression flow path and fluid flow through said rebound flow path are separately adjustable;

an adjuster knob coupled to said adjuster rod, said adjuster knob providing user access to said damping selection assembly;

a detent mechanism for indicating the degree to which said adjuster knob has been rotated; and wherein:

said damping system is positioned within said piston rod;

a piston is connected to said piston rod and slidably disposed within a damping cartridge containing a fluid, whereby relative movement between said piston and said damping cartridge causes fluid to flow through said compression flow path or said rebound compression flow path;

said compression adjuster further comprises a blocking element, said damping selection assembly being coupled to said compression adjuster to move said blocking element with respect to said compression inlet to modify flow through said compression flow path and thereby modify compression damping;

said rebound adjuster further comprises a blocking element, said damping selection assembly being coupled to said rebound adjuster to move said blocking element with respect to said rebound inlet to modify flow through said rebound flow path and thereby modify rebound damping; and said flow path through said compression damping circuit may be adjusted independently of said flow path through said rebound damping circuit by pushing in and turning, or by pulling out and turning, said adjuster knob.

37. An adjustable damping system as in claim 36, wherein said detent mechanism comprises an index ball and a detent surface, said index ball riding against said detent surface to provide at least a tactile indication of the degree to which said adjuster knob has been rotated.

38. An adjustable damping system for damping a flow of damping fluid in a suspension system undergoing compression and rebound, said adjustable damping system comprising:

a piston rod;

a damping adjusting mechanism having a compression adjuster and a rebound adjuster;

a compression damping circuit having a compression flow path defined therethrough and comprising a compression inlet defined in said piston rod, a compression outlet defined in said piston rod, and a compression flow passage defined in said compression adjuster;

a rebound damping circuit having a rebound flow path defined therethrough and comprising a rebound inlet defined in said piston rod, a rebound outlet defined in said piston rod, and a rebound flow passage defined in said rebound adjuster;

a damping selection assembly coupled to said damping adjusting mechanism and comprising a compression coupler coupled to said compression adjuster, a rebound coupler coupled to said rebound adjuster, and an adjuster rod for selective engagement with said compression coupler and said rebound coupler, said damping selection assembly being capable of moving said compression adjuster and said rebound adjuster independently of one another so that fluid flow though said compression flow path and fluid flow through said rebound flow path are separately adjustable;

an insert positioned within said piston rod and through which said adjuster rod is axially slidable;

an adjuster knob coupled to said adjuster rod, said adjuster knob providing user access to said damping selection assembly; and wherein:

said damping system is positioned within said piston rod;

a piston is connected to said piston rod and slidably disposed within a damping cartridge containing a fluid, whereby relative movement between said piston and said damping cartridge causes fluid to flow through said compression flow path or said rebound compression flow path;

said compression adjuster further comprises a blocking element, said damping selection assembly being coupled to said compression adjuster to move said blocking element with respect to said compression inlet to modify flow through said compression flow path and thereby modify compression damping;

said rebound adjuster further comprises a blocking element, said damping selection assembly being coupled to said rebound adjuster to move said blocking element with respect to said rebound inlet to modify flow through said rebound flow path and thereby modify rebound damping; and said flow path through said compression damping circuit may be adjusted independently of said flow path through said rebound damping circuit by pushing in and turning, or by pulling out and turning, said adjuster knob.

39. An adjustable damping system as in claim 38, wherein said piston rod is crimped to said insert.

40. An adjustable damping system as in claim 38, wherein said compression coupler and said rebound coupler are each axially fixed with respect to said insert and each other.

* * * * *